United States Patent
Carbune et al.

(10) Patent No.: US 10,521,655 B1
(45) Date of Patent: Dec. 31, 2019

(54) GENERATING AND PROVISIONING OF ADDITIONAL CONTENT FOR BIASED PORTION(S) OF A DOCUMENT

(71) Applicant: Google LLC, Mountain View, CA (US)

(72) Inventors: Victor Carbune, Winterthur (CH); Thomas Deselaers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/272,610

(22) Filed: Feb. 11, 2019

(51) Int. Cl.
| | |
|---|---|
| *G06K 9/00* | (2006.01) |
| *G06K 9/34* | (2006.01) |
| *G06F 16/38* | (2019.01) |
| *G06F 16/383* | (2019.01) |
| *G06N 20/00* | (2019.01) |

(52) U.S. Cl.
CPC ....... *G06K 9/00469* (2013.01); *G06F 16/382* (2019.01); *G06F 16/383* (2019.01); *G06K 9/344* (2013.01); *G06N 20/00* (2019.01); *G06K 2209/01* (2013.01)

(58) Field of Classification Search
None
See application file for complete search history.

(56) References Cited

U.S. PATENT DOCUMENTS

| | | | |
|---|---|---|---|
| 8,516,374 B2 | 8/2013 | Fleischman et al. | |
| 8,924,436 B1* | 12/2014 | Fortuna | G06F 16/951 707/811 |
| 9,092,514 B2 | 7/2015 | Cardie et al. | |
| 9,285,973 B1* | 3/2016 | Gable | G06Q 30/0282 |
| 9,860,337 B1* | 1/2018 | Brown | H04L 67/306 |
| 2009/0281978 A1 | 5/2009 | Gordon et al. | |
| 2011/0106819 A1* | 5/2011 | Brown | G06F 16/34 707/749 |
| 2014/0173425 A1* | 6/2014 | Hailpern | G06F 17/24 715/256 |
| 2014/0281877 A1* | 9/2014 | Burge | G06F 16/958 715/230 |

(Continued)

OTHER PUBLICATIONS

Moreira C, Martins B, Calado P. Using rank aggregation for expert search in academic digital libraries. arXiv preprint arXiv: 1501. 05140. Jan. 21, 2015. (Year: 2015).*

*Primary Examiner* — Kim Y Vu
*Assistant Examiner* — Nathan J Bloom
(74) *Attorney, Agent, or Firm* — Middleton Reutlinger

(57) ABSTRACT

Implementations described herein determine, for a given document generated by a given source, one or more portions of content (e.g., phrase(s), image(s), paragraph(s), etc.) of the given document that may be influenced by bias of the given source. Further, implementations determine one or more additional resources that are related to the given source and that are related to the portion(s) of content of the given document. Yet further, implementations utilize the additional resource(s) to determine additional content that provides context for the portion(s) that may be influenced by bias. A relationship, between the additional resource(s) and the portions of the given document, can be defined. Based on the relationship being defined, the additional content can be caused to be rendered at a client device in response to the client device accessing the given document.

19 Claims, 7 Drawing Sheets

(56) References Cited

U.S. PATENT DOCUMENTS

| | | | |
|---|---|---|---|
| 2015/0089409 A1* | 3/2015 | Asseily | G06Q 10/10 715/765 |
| 2016/0224803 A1* | 8/2016 | Frank | G06F 21/6245 |
| 2016/0379515 A1 | 12/2016 | Okubo et al. | |
| 2018/0018316 A1* | 1/2018 | Bogdan | G06F 17/2785 |
| 2018/0113855 A1* | 4/2018 | Bostick | G06F 17/2785 |

* cited by examiner

Travel to Thailand!
By Jim Smith

Thailand is a nation in southeast Asia that is home to over 60 million people. With bustling metropolises like Bangkok and Chiang Mai, Thailand is the best country in Asia to visit. Not only is Thailand home to many cultural wonders, but then country is known for its wonderful cuisine. As evidence, famous food travel expert Anthony Example has traveled numerous times to Thailand. He has tried all types of cuisine and loves the food of Thailand. So, if you are thinking of traveling somewhere adventurous, give Thailand a try!

The author is a travel agent that specializes in trips to Thailand.

Anthony Example has written numerous articles and books related to all types of cuisine, including Thai cuisine.

Document A
Document B

FIG. 4A

GENERATING AND PROVISIONING OF ADDITIONAL CONTENT FOR BIASED PORTION(S) OF A DOCUMENT

BACKGROUND

A user may have interest in reading a document, but have little or no knowledge of the source (e.g., author, creator, and/or publisher) of the document. For example, a user may read a news article without knowing the author of the article, the background of the author, and/or the intended audience for the document. In some instances, the document includes information that is not necessarily based on objective reasoning but is, instead, based on experiences and/or opinions that are particular to the source. Some instances of biased content of a document may be identifiable by the user without additional information. However, some content may have instances that are not readily recognizable by the reader as biased. Further, whether content of a document is considered biased can be a subjective determination by a user and, as result, can vary from user to user. For example, one user can deem certain content biased, while another user may not deem that certain content biased).

In some instances, the source of a document may be the source of additional documents, the source may be the subject of other documents, and/or additional information regarding the experiences of the source may be available. A user can attempt to manually identify these additional documents and/or information. However, substantial computational and network resources can be required for the user to search for and identify relevant additional information related to the source in order to decide whether any of the statements of the source are biased. For example, the user may have to switch to another application on their computing device, issue one or more searches for additional information about the source using the other application, and review such information. This can consume both resources of the computing device (e.g., switching to the other application and reviewing information) and network resources (e.g., in issuing the searches and retrieving the information). Further, such consumption of resources is exacerbated when multiple users that view the document each perform similar searches and reviews of source information. Yet further, different users can identify different additional information when determining whether statement(s) of a source are biased. This can be due to the different users performing different searches, selecting different search results, viewing different portions of selected search result document(s), etc. As a result of the different additional information, the different users can reach different conclusions with regards to whether the statement(s) are indeed biased.

SUMMARY

Implementations described herein determine, for a given document generated by a given source, one or more portions of content (e.g., sentences, phrases, paragraphs, etc.) of the given document that may be influenced by bias of the given source. Further, those implementations determine one or more additional documents that are related to the given source (e.g., also from the given source and/or describing the given source) and that are related to the portion(s) of content of the given document. Yet further, some of those implementations utilize the additional document(s) to determine additional content that provides context for the portions of content of the given document that may be influenced by bias of the given source. A relationship, between the additional content and the portions of the given document, can be defined. Based on the relationship being defined, the additional content can be caused to be rendered at a client device in response to the client device accessing the given document. For example, rendering of the given document can be modified to incorporate the additional content, the additional content can be presented in a pop-up window, or a selectable indication of the additional content can be provided and, if selected, can cause the additional content to be presented. As described herein, determining that a portion of content is a biased portion can be an objective determination. Further, determining additional document(s) and/or additional content based on the additional document(s) can likewise be an objective determination. Accordingly, implementations present a uniform (e.g., independent of a user's analysis) process for determining whether portion(s) of a document are biased and/or for determining additional document(s) and/or additional content that are related to a source of a biased portion.

As one example, a user can access a document that is related to the travel experiences of an author of the document. The document can include the phrase "Thailand is the best country in Asia." Based on one or more terms of the phrase (e.g., "best" being a term that implies an opinion), the phrase can be identified as a phrase that may be biased by the opinion of the author. Additional documents associated with the author can include other articles written by the author, publicly available biographical information for the author, and/or other documents that detail the experiences of the author. The additional documents and the suspected biased phrase can be provided as input to a trained machine learning model to generate a relatedness score between the phrase and each of the additional documents. For example, one of the documents can include information related to other countries that the author has visited. Based on a generated relatedness score between the additional document and the identified phrase being indicative of relevance of the content of the additional document and the phrase, additional content can be determined based on the additional document. For instance, the additional content can include a link to the additional document, a summary of the additional document, and/or other information regarding the author that is identified from the additional document. For example, the additional content can include a pop-up box associated with the phrase "Thailand is the best country in Asia", where the pop-up box indicates that Thailand is the only country in Asia that the author has visited, as identified from the related additional document.

The above is provided as an overview of some implementations disclosed herein. Further description of these and other implementations is provided below.

In some implementations, a method performed by one or more processors is provided and includes identifying a target electronic document and a source that generated the target electronic document. The method further includes processing the target electronic document to determine a biased portion of the target electronic document, and searching one or more corpuses to identify a plurality of additional resources that are related to the source. The method further includes, for each of the identified additional resources that are related to the source: processing corresponding additional resource features of a corresponding one of the additional resources and features of the biased portion to generate a corresponding relatedness score, wherein the corresponding relatedness score indicates a degree of relatedness between the biased portion and the corresponding one of the additional resources. The method further includes, responsive to determining that the relatedness score, of a given additional resource of the additional resources, satisfies a threshold: defining, in one or more databases, a relationship between the target electronic document and additional content generated based on the given additional resource. The method further includes, subsequent to defining the relationship, and responsive to the relationship being defined: causing a computing device that is rendering the target electronic document to render at least a portion of the additional content and/or a link to the additional content, simultaneous with the rendering of the target electronic document at the computing device.

These and other implementations of technology disclosed herein can optionally include one or more of the following features.

In some implementations, defining the relationship between the target electronic document and the additional content generated based on the given additional resource includes defining a relationship between the biased portion of the target electronic document and the additional content. In some of those implementations, causing the computing device that is rendering the target electronic document to render the at least a portion of the additional content simultaneous with the rendering of the target electronic document at the computing device includes: causing the computing device to render the at least a portion of the additional content along with rendering an indication that the at least a portion of the additional content is relevant to the biased portion. In some versions of those implementations, for the target electronic document, the at least a portion of the additional content is defined as having a relationship to only the biased portion. In some of those versions, the indication that the at least a portion of the additional content is relevant to the biased portion is an indication that the additional content is relevant to only the biased portion.

In some implementations, causing the computing device that is rendering the target electronic document to render the at least a portion of the additional content simultaneous with the rendering of the target electronic document at the computing device includes: causing the computing device to initially render a selectable interface element that indicates additional content relevant to bias is available, without initially rendering the at least a portion of the additional content; and causing the computing device to render the at least a portion of the additional content responsive to affirmative user interface input directed to the selectable interface element.

In some implementations, the method further includes generating the additional content based on the given additional resource. In some of those implementations, generating the additional content includes: including a link to the given additional resource in the additional content, including a phrase from the given additional resource in the additional content, and/or including a summary of the given additional resource in the additional content.

In some implementations, the method further includes generating the additional content based on the given additional resource and based on a further additional resource of the additional resources. Generating the additional content based on the further additional resource can be responsive to the corresponding relatedness score of the further additional resource satisfying the threshold.

In some implementations, processing the corresponding additional resource features of the corresponding one of the additional resources and the features of the biased portion to generate a corresponding relatedness score includes: applying the corresponding additional resource features and the features of the biased portion as input to a trained machine learning model; and generating the corresponding relatedness score based on processing the corresponding additional resource features and the features of the biased portion using the trained machine learning model.

In some implementations, the additional resources related to the source include: other documents written by the source; documents that include references to the source; and/or one or more entries, in a knowledge graph, that are mapped to a source entry, of the knowledge graph, that corresponds to the source; and/or documents that include references to one or more terms in the target electronic document.

In some implementations, the method further includes: processing the target electronic document to determine an additional biased portion of the target electronic document; and generating an additional relatedness score that indicates a degree of relatedness between the additional biased portion and the given additional resource. Generating the additional relatedness score is based on processing of the corresponding additional resource features and additional features of the additional biased portion. In some of those implementations, the method further includes determining that the additional relatedness score fails to satisfy the threshold, and defining the relationship between the target electronic document and the additional content generated based on the given additional resource includes: defining the relationship between the biased portion of the target electronic document and the additional content, based on the relatedness score satisfying the threshold, and refraining from defining any relationship between the additional biased portion of the target electronic document and the additional content, based on the additional relatedness score failing to satisfy the threshold.

In some implementations, causing the computing device that is rendering the target electronic document to render the at least a portion of the additional content simultaneous with the rendering of the target electronic document at the computing device includes: causing the computing device to render the at least a portion of the additional content along with rendering an indication that the additional content is relevant to the biased portion.

In some implementations, the source is an author, a creator, and/or a publisher.

In some implementations, a method implemented by one or more processors is provided and includes: identifying a target electronic document and a source that generated the target electronic document; processing the target electronic document to determine a biased portion of the target electronic document; searching one or more corpuses to identify a plurality of additional resources that are related to the source; determining a relatedness score between each of the additional resources and the biased portion of the target electronic document; and generating a bias summary for the biased portion of the target electronic document. The bias summary is generated based on one or more of the additional resources and the relatedness scores of the corresponding one or more additional resources. The method further includes responsive to a request, from a computing device, for the target electronic document: causing the computing device to render an interface that includes the target electronic document with a selectable portion that, when selected, causes the bias summary to be rendered along with the target electronic document.

These and other implementations of technology disclosed herein can optionally include one or more of the following features.

In some implementations, the selectable portion includes the biased portion, and further includes causing the biased portion to be graphically demarcated from non-biased portions of the target electronic document.

In some implementations, the bias summary, when rendered, is rendered in a separate interface portion when a user selects the selectable portion of the target electronic document.

In some implementations, the selectable portion consists of the biased portion.

In some implementations, the bias summary, when rendered, is rendered in a separate section of the interface from the target electronic document, and selecting the biased summary, when rendered, causes at least a portion of the one or more additional resources to be rendered.

In some implementations, the bias summary is generated based on at least a first additional resource and a second additional resource of the one or more of the additional resources.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4A illustrates an example of the additional content rendered along with the target electronic document.

DETAILED DESCRIPTION

Figure 1:
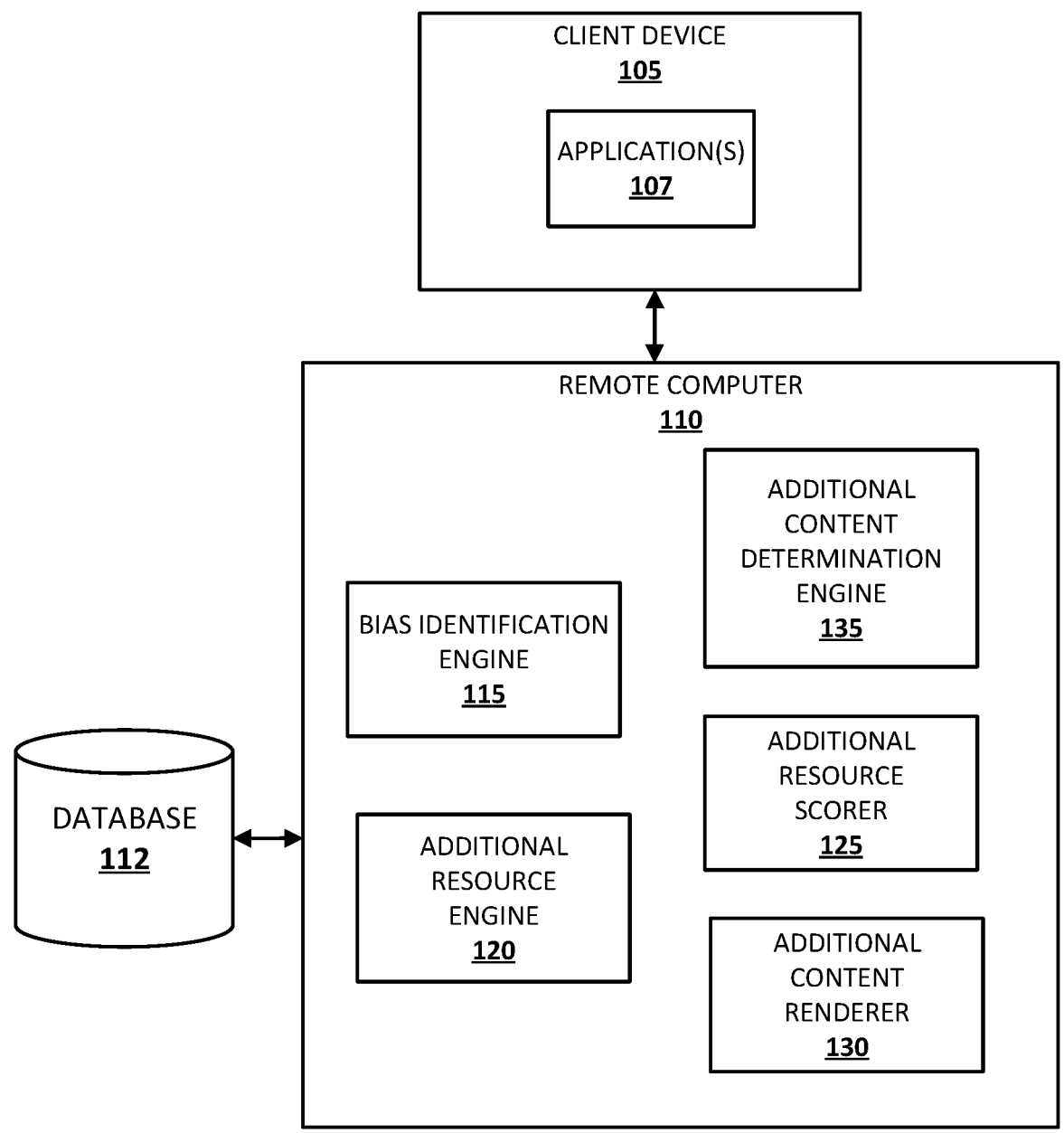
FIG. 1 is a block diagram of an example environment in which implementations disclosed herein can be implemented.

Now turning to FIG. 1, an example environment in which techniques disclosed herein can be implemented is illustrated. The example environment includes a client device 105 and a remote computer 110. Although both the client device 105 and the remote computer 110 are each illustrated in FIG. 1 as single components, it is understood that one or more modules and/or aspects of either can be implemented, in whole or in part, by one or more other devices. For example, in some implementations a first set of modules and/or aspects are implemented by one or more processors of a first remote system, and a second set of modules and/or aspects are implemented by one or more processors of one or more separate remote server device(s) that are in network communication with the remote computer 110. The remote server system(s) can be, for example, a cluster of high performance remote server device(s) that handle requests from one or more client devices, as well as requests from additional devices.

Client device 105 can be a mobile phone computing device, a tablet computing device, and/or a wearable apparatus of the user that includes a computing device (e.g., a watch of the user having a computing device, glasses of the user having a computing device, a virtual or augmented reality computing device). Additional and/or alternative client devices can be provided. Further, one or more components of client device 105 can be implemented on separate devices. For example, application(s) 107 can be implemented on one or more alternate computing devices that are in communication with client device 105. Components of client device 105 and components of remote computer 110 can communicate via a communication network. The communication network can include, for example, a wide area network (WAN) (e.g., the Internet). Further, components of client device 105 can communicate with one or more other components via a communication network. For example, communication network can include a local area network (LAN) and/or BLUETOOTH and can communicate with one or more other devices via the LAN and/or BLUETOOTH (e.g., an automated assistant device communicating with a handheld computing device of a user).

Client device 105 includes one or more applications 107 that can each be utilized to render content to a user of the client device. For example, a user can utilize one of the application(s) 107 (e.g., a web browser application or an automated assistant application) to provide a search query to search engine, and the search engine can provide result(s) responsive to the search query. The user can view results provided by the search engine, and click on (or otherwise select) one of the results to cause the application 107 to render a corresponding document and/or other content corresponding to the search query. The user can interact with the application 107 via one or more input devices of the client device 105, such as a keyboard, a mouse and/or other input device that can select an area of the interface 107, voice controls, touchscreen controls, and/or other input methods that allow the user to submit input and select content to be rendered.

In some implementations, one or more modules of client device 105 and/or remote computer 110 can render a document via one of the application(s) 107. For example, the user can interact with a search engine by providing a search query and the search engine can provide the user with one or more documents (or selectable indications of documents) that can be rendered to the user. The user can then view the rendered content via the application 107 and can, in some instances, interact with the rendered content to be provided with additional content (e.g., selecting links in documents, selecting graphical user interface buttons). As another example, the user can navigate, within one of the application(s) 107, to the document directly.

As an example, a user can be provided, via one of the application(s) 107, with a search result that is responsive to a submitted query of "Articles about travel to Asia". The user can select one of the search results and one of the application(s) 107 can render the document that is associated with the selected link. As used herein, the document of interest to the user will be referred to as the "target electronic document." This can be a document that is rendered based on a search query, as previously described and/or a document that is otherwise rendered via one or more application(s) executing on the client device 105.

A "document", as used herein, is to be broadly interpreted and can include, for example, an article, a news item, a blog entry, a social media posting, a web page, an email, a news group posting, a word processing document, a portable document format document, and/or other documents. Further, implementations described herein can be applied to all or portions of a document. A portion of a document can include, for example, a sentence, a phrase, a title, a footnote, an advertisement, an image, and/or other portions.

In many instances, a target electronic document is associated with at least one source. The at least one source can include an author of the document, the publisher of the document, and/or a creator of the document. The publisher of a document can be, for example, a website that hosts the document and/or a corporation that prepares and/or publishes the document. For example, a news agency that prepares and/or publishes a news article can be the publisher of the news article document. The creator of a document can be one or more individuals that collated content of the document, but that didn't necessarily originally author the content of the document. The author of a document can be the individual that penned the textual content of the document and/or generated other portions (e.g., images) of the target electronic document. For example, a target electronic document that is a news story can specify the source in the text of the document, can specify the source in metadata associated with the document, and/or the source can be identified based on content of another related document. Because the author is human, the creator includes one or more humans, and humans act on behalf of the publisher, and those human(s) have unique experiences and opinions, one or more portions of the target electronic document may be biased based on those opinions and/or experiences. In some instances, the reader may not be aware of these experiences and/or opinions and may accept the content of the document as objective even if one or more portions may in fact be skewed by the opinion of the source.

To determine whether portion(s) of a target electronic document are biased based on source opinions, a user may have to view multiple resources to determine the source bias, if one even exists. Further, the user may navigate through multiple documents to determine the source bias and may not find an additional resource that is related to a bias (and further, may not know when to stop searching for a bias). Thus, additional computing resources and time may be expended, sometimes uselessly (i.e., if no bias can be determined from additional resources) for a user to determine whether bias exists. Thus, by providing the user with indications in a target electronic document of potentially biased portions and further providing the user with additional resources to allow the user to determine whether a particular portion is biased, it is unnecessary for the user to perform additional searching. Further, the user can be provided with a summary of additional resources within the target electronic document, which reduces the need for the user to navigate away from a target electronic document to assess additional resource(s) that can indicate potential bias. Moreover, implementations present an objective and uniform process for determining whether portion(s) of a document are biased and/or for determining additional document(s) and/or additional content that are related to a source of a biased portion. Accordingly, whether portions of a document are considered biased and/or additional content that is presented for biased portions can be determined independent of subjective considerations of a user to which the additional content is presented.

Bias identification engine 115 determines whether one or more portions of a target electronic document include biased content and, if so, flags such portion(s) as biased. Biased portions of a target electronic document are portions of the document that indicate that the source may have included such portions based on opinion and/or experience, and not on objective facts. As described herein, bias identification engine 115 can utilize various techniques to determine that a portion of a target electronic document is biased. It is noted that, in various implementations, a determination that a portion of a target document is biased does not necessarily conclusively mean that the portion is biased. Rather, it means that bias identification engine 115 has determined, utilizing one or more objective techniques such as those disclosed herein, that a feature of the portion and/or a measure determined based on the portion, indicates that the portion has at least a threshold probability of being biased.

Figure 2:
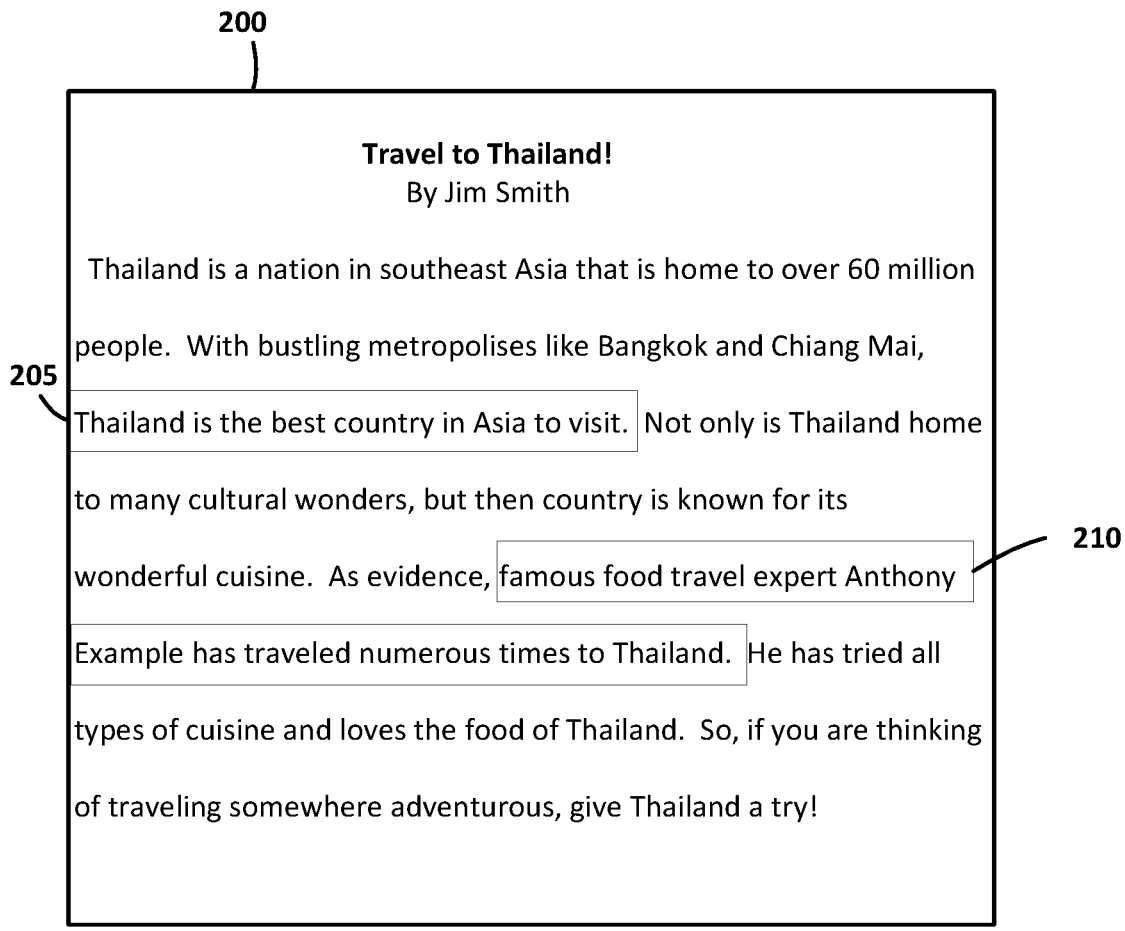
FIG. 2 illustrates a target electronic document with biased portions highlighted.

Referring to FIG. 2, an example of a target electronic document is provided. The target electronic document 200 includes portions 205 and 210 that may be biased. Bias identification engine 115 can determine that portions 205 and 210 are biased based on one or more terms included in the portions, based on similarity between the portions and one or more other documents that have been annotated to indicate that a portion includes a bias, and/or based on other methods that determine that a portion includes a biased statement.

Portion 205 includes one or more terms that bias identification engine 115 can identify as terms that likely indicate bias. For example, the portion 205 states that "Thailand is the best country in Asia to visit." In some implementations, bias identification engine 115 can identify one or more terms, such as "best," as terms that are often biased and not based wholly on objective facts. Thus, in some of those implementations, bias identification engine 115 can determine that portion 205 is biased, based at least in part on presence of the term "best". Other terms that can indicate bias are "I" and/or "I think," other superlatives ("greatest," "worst," etc.), and/or other terms that indicate that the corresponding portion of the document is influenced by the author's opinions.

In some implementations, bias identification engine 115 can additionally or alternatively determine that a portion of the target electronic document is a biased portion based on comparison between the portion and one or more annotated documents (e.g., human annotated documents). For example, one or more humans can be provided with a number of documents and the user can annotate each document with an indication of whether the document is biased, a score indicative of the level of bias in a document, and/or other annotations that can be utilized by bias identification engine 115 to determine whether a portion is similar to other biased documents. For example, bias identification engine 115 can compare portion 210, which states that "Famous food travel expert Anthony Example has traveled numerous times to Thailand," with other annotated documents and, based on the similarities between the portion 210 and documents that are annotated as biased, determine that portion 210 is biased. Portion 210 can be biased based on a declaration by the author that Anthony Example is "a famous food travel expert."

In some implementations, bias identification engine 115 additionally or alternatively utilizes a trained machine learning model in determining whether a portion of a document is biased. For example, the trained machine learning model can be trained based on training instances that each include training instance input of a portion of text (and/or a representation of the portion of text), and training instance output that indicates whether the portion of text is biased. As one particular example, the trained machine learning model can be a feed forward neural network and the training instance inputs can each be an embedding (e.g., a Word2Vec embedding) of a corresponding portion of text, and the training instance outputs can each be a human labeled indication of whether the corresponding portion of text is biased. For instance, the training instance outputs can be "1" if a corresponding portion of text is deemed "highly likely biased", "0.75" if the corresponding portion of text is deemed "likely biased", "0.5" if the corresponding portion of text is deemed "possibly biased", "0.25" if the corresponding portion of text is deemed "likely unbiased", and "0" if the corresponding portion of text is deemed "highly likely unbiased". As another example, the trained machine learning model can be a recurrent neural network that accepts portions of text on a term-by-term or token-by-token basis, the training instance inputs can each be a corresponding portion of text, and the training instance outputs can each be a human labeled indication of whether the corresponding portion of text is biased. In use, bias identification engine 115 can process a portion of text, using the trained machine learning model, to generate a measure that indicates whether the portion is biased, and determine whether the portion is biased based on the measure. For example, if the measure satisfies a threshold (e.g., greater than 0.5), the bias identification engine can determine the corresponding portion of text is biased.

Additional resource engine 120 searches to identify additional resources that are related to at least one source of the target electronic document. In some implementations, to conserver network and/or computation resources, additional resource engine 120 searches to identify additional resources for the target electronic document only if biased portion(s) of the target electronic document have been identified by bias identification engine 115. In some implementations, additional resource engine 120 can identify documents that are associated with the source(s), such as documents that were written by an author of the target document, documents that mention the author, documents that are published by a publisher of the target document, documents that mention the publisher, documents that are created by a creator of the target document, and/or other documents that can indicate a bias of source(s) of the target document. In some implementations, additional resource engine 120 can utilize a search query that includes one or more terms from biased portion(s) of the target electronic document (or based on the biased portion(s)) to identify additional resources that may be pertinent to the biased portion(s). Such a search query can also include a name of source(s) of the target electronic document, or be restricted to a search of document(s) by and/or related to one or more of the source(s), to identify additional resources that are generated (e.g., authored, published, and/or created) by the source and that may be pertinent to one or more of the biased portions of the document. For example, referring to FIG. 2, additional resource engine 120 can submit a search query of "author Jim Smith" to be provided with documents related to the author. Also, for example, additional resource engine 120 can additionally or alternatively submit a search query of "Thailand", with a restriction of "author: Jim Smith" to a search engine to be provided with documents related to the author that are also related to the subject matter of the document. Also, for example, additional resource engine 120 can additionally or alternatively submit a search query of "Thailand" with a restriction of "author: Jim Smith" to identify document(s) related to portion 205, and submit a search query of "Anthony Example Thailand" to identify document(s) related to portion 210. As yet another example, if target electronic document 200 is published by Hypothetical News Corporation, additional resource engine 120 can additionally or alternatively submit a search query with a restriction of "publisher: Hypothetical News Corporation", and optionally with a restriction of "author: Jim Smith". If both restrictions are included, identified additional resources will be restricted to those that are by "Jim Smith" and published by "Hypothetical News Corporation".

As mentioned above, in some implementations, the additional resources can include other documents written by the same author as the target electronic document, published by the same publisher as the target electronic document, and/or created by the same creator as the target electronic document. For example, a search query seeking additional resources for a target electronic document penned by "Jim Smith" can include "Jim Smith", or a restrict identifier of "Jim Smith", or the search corpus can be restricted to document(s) penned by "Jim Smith". For example, additional resource engine 120 can search one or more databases, such as a database that includes author names and authored documents, to identify the documents that were penned by the author.

In some implementations, the additional resources can include one or more documents that include a reference to the source of the target electronic document. For example, one or more documents can include a biography of an author and/or otherwise reference the author (but are not necessarily penned by the author). To identify additional resource(s) about a source, a search query seeking the additional resources can include the source's name, or the search corpus can be restricted to document(s) that have a defined relationship to the source (e.g., in a database that maps documents to corresponding entities referenced in the documents). Referring again to FIG. 2, portion 205 states that "Thailand is the best country in Asia to visit." Additional resource engine 120 can identify a website and/or other document as an additional resource based on the document including a biography of the author that indicates "Jim Smith is a travel agent that specializes in trips to Thailand," which can be utilized by a reader to assess whether a statement in the target electronic document is biased.

In some implementations, additional resource engine 120 can identify one or more documents that include references to one or more terms included in the target electronic document. For example, portion 210 includes a reference to "Anthony Example" and the author may be basing a statement on the opinion of another person and/or may be making a biased statement about a person and/or other subject. For example, the statement "Thailand is a huge country" may be an opinion of the author. Thus, additional information related to Thailand's population and/or area may assist a reader is determining whether the country is in fact "huge." To identify the bias of another author and/or person, additional resource engine 120 can search to identify additional resources that can indicate a bias of the author regarding another subject.

In some implementations, additional resource engine 120 can identify one or more additional resources based on entries in a knowledge graph. For example, additional resource engine 120 can identify an entry for the source in a knowledge graph. Further, the entry for the source can be further mapped, in the knowledge graph (directly and/or indirectly), to one or more additional entries that are related to document(s) that have been generated by the source of the target electronic document. The additional resource engine 120 can identify the document(s) for the one or more additional entries based on those entries being mapped, in the knowledge graph, to the entry for the source. As another example, the entry for the source can be further mapped, in the knowledge graph, to one or more additional entries that each define a corresponding curated resource for the source, and one or more of the corresponding curated resources can be utilized as an additional resource. For instance, a curated resource for an author can include information indicating topic(s) for which the author is considered an expert, topic(s) about which the author has written, and/or other information. Also, for instance, a curated resource for a publisher can include information indicating topic(s) for which the publisher is considered an expert, topic(s) about which the publisher has published, verified biases of the publisher, and/or other information. Such a curated resource for a source can be utilized as an additional resource.

For each of the identified additional resources, additional resource scorer 125 can optionally determine one or more relatedness scores that are each indicative of relatedness between the additional resource (or a portion of the additional resource) and the electronic document. For example, the additional resource scorer 125 can determine, for a given additional resource, a first relatedness score between the given resource and a first biased portion of the target electronic document, a second relatedness score between the given resource and a second biased portion of the target electronic document, etc. For instance, the additional resource scorer 125 can determine the first relatedness score based on comparison of the first biased portion to one or more aspects of the given resource, can determine the second relatedness based on comparison of the second biased portion to one or more aspects of the given resource (the same and/or alternative aspect(s)), etc. Further, as described herein, based on the multiple relatedness scores for the given resource, the given resource can be determined to be relevant to (and stored in association with) only some of multiple biased portions (e.g., only one biased portion).

Additional resource scorer 125 can determine a relatedness score based on comparison of features of a given additional resource to identified biased portion(s) of the target electronic document. For example, additional resource engine 120 can identify an additional resource that mentions "Anthony Example" and additional resource scorer 125 can determine a relatedness score for the additional portion 210 and the additional resource that is more indicative of relatedness than is a relatedness score for the portion 205 and the additional resource. This can be based on term(s) in the additional resource matching (soft and/or exact) term(s) in the additional portion 210, but failing to match term(s) in the portion 205 (e.g., the portion 205 does not mention "Anthony Example", and the additional resource may not include any content related to "Thailand"). Also, for example, additional resource engine 120 can identify a document that includes the term "Thailand" and additional resource scorer 125 can determine a relatedness score for the additional resource and portion 205 that is more indicative of relatedness than is a relatedness score for the additional resource and additional portion 210 (e.g., the additional resource may include the terms "Thailand" and "Asia", that are included in portion 205, but lack the term "Anthony Example").

In some implementations, in determining a relatedness score between portion(s) of a target electronic document and an additional resource, additional resource scorer 125 can process features of the additional resource and features of the biased portion(s) using a trained machine learning model, and generate the relatedness score based on such processing. For example, features of a given portion and features of the additional resource can be processed to generate a relatedness score between the given portion and the additional resource. In some implementations, the machine learning model can be trained based on training instances that each include training instance input of: a biased portion of text (and/or a representation of the biased portion of text), and content from a corresponding additional resource (and/or a representation of the content); and training instance output that indicates whether the content from the corresponding additional resource provides additional context for the biased portion of text. As one particular example, the trained machine learning model can be a feed forward neural network and the training instance inputs can each be: an embedding (e.g., a Word2Vec embedding) of a corresponding biased portion of text, and an embedding of corresponding content from a corresponding additional resource (e.g., a Word2Vec or other embedding of a snippet of text identified based on including one or more term(s) in common with the biased portion). The training instance outputs can be a human labeled indication of whether the corresponding content from the corresponding additional resource provides additional context for the biased portion of text. For instance, the training instance outputs can be "1" if a corresponding portion of text is deemed "fully explanatory of the bias", "0.5" if the corresponding portion of text is deemed "somewhat explanatory of the bias", and "0" if the corresponding portion of text is deemed "unrelated to the bias". Additional and/or alternative machine learning models can be utilized, such as those having architectures utilized in determining whether two pieces of content are similar, but using "whether one piece of content explains bias in the other piece of content" as a supervisory signal instead of similarity. In use, additional resource scorer can process biased portion(s) (or features thereof) and content from an additional resource (or features thereof), using the trained machine learning model, to generate relatedness score that indicates whether the content from the additional portion is explanatory of bias in the biased portion, and determine whether the portion is biased based on the measure.

For each of the additional resources with a relatedness score that satisfies a threshold, additional content determination engine 135 defines a relationship between additional content generated from each of those additional resources and the target electronic document. A relationship between additional content from an additional resource and a target electronic document can be stored in a database, such as database 112. For example, referring again to FIG. 2, additional content from a document that indicates that the author (i.e., "Jim Smith") is a travel agent that specializes in travel to Thailand can be stored with a relationship to the target electronic document and/or to biased portion 205. Storing the relationship in the database 112 can occur prior to a subsequent retrieval of the target electronic document by a computing device of a user, and enable quick and efficient retrieval of the additional content for provisioning of the additional content (for rendering along with the target electronic document). Moreover, storing the relationship in the database 112 enables the relationship to be stored once, but utilized for many subsequent retrievals of the target electronic document. This can conserve significant resources compared to, for example, if the relationship was not stored and additional content not rendered—and manual searches for determining whether the target electronic document included biased content instead occurred.

In various implementations, additional content determination engine 135 only stores a relationship between the additional content of an additional resource and the target electronic document if the relatedness score satisfies a threshold. For example, additional resource scorer 125 can determine a relatedness score between additional content from an additional resource and the target electronic document that is a binary score (e.g., "1" for related and "0" for unrelated), and store the relationship if the relatedness score is a "1". Also, for example, a determined relatedness score can include a range of values, with a higher value indicating that the additional content is more indicative of relatedness than a relatedness score that is a lower number (e.g., "0.9" indicating additional content that is more related to a target electronic document than additional content with a score of "0.3"). In such an example, the additional resource scorer 125 can store the relationship if the relatedness score is greater than "0.6", or other value.

In some implementations, additional content engine 135 defines a relationship between additional content and the target electronic document as a whole. For example, additional content engine 135 can associate document 200 with additional content that is identified by additional resource engine 120. In some implementations, additional content determination engine 135 can define a relationship in database 112 that is between a biased portion of the target electronic document and additional content. For example, referring again to FIG. 2, content determination engine 135 can define a relationship between portion 205 and additional content from a first additional resource. Further or alternatively, additional content determination engine 135 can define a second relationship between portion 210 and additional content from a second additional resource (or a relationship between portion 210 and additional content from the first additional resource). Each of the defined relationships can be stored in database 112 and later accessed to render the additional content with the target electronic device.

In some implementations, additional content can be the entire additional resource. For example, the additional content can be the entire resource such that the entire additional resource can be rendered with the target electronic document, as described herein. In some implementations, additional content can include a portion of the related additional resource. For example, rather than associating an entire additional resource with the target electronic document, the relationship between a phrase from the additional resource that is related to the target electronic document (or a biased portion of the target electronic document) can be stored in database 112.

In some implementations, additional content can include a selectable portion, such as a link, to the additional resource. A link can be associated with, for example, a location of the additional resource. For example, the link can be associated with web address of an additional resource and by selecting the link, at least a portion of the additional resource can be rendered. Alternatively or additionally, the link can be a reference to a database entry, a directory on a computing device, and/or other link that allows a user to access the specific additional resource.

In some implementations, additional content can include a summary of the related additional resource. For example, one or more phrases and/or portions of the additional resource can be utilized to generate a summary of the contents of the additional resource. In some implementations, an additional resource can include a summary, which can then be identified as the additional content of the additional resource. For example, the additional resource can be an article that includes a summary at the start of the article. Also, for example, an additional resource can include a biography of the author at the end of the document (e.g., a short biography of the reporter at the end of a news story), and the biography utilized as the summary.

In some implementations, additional content can be generated from two or more additional resources. For example, a first additional resource and a second additional resource can both have relatedness scores that satisfy a threshold. Additional content determination engine 135 can generate additional content that is based on first content from the first additional resource and second content the second additional resource. For example, additional content can include a bias summary that is generated based on content from two or more additional resources.

As an example, a first additional resource can include the phrase "Jim Smith is a travel agent specializing in trips to Thailand." Further, a second additional resource can be a biography of the author and include the phrase "He has been to Thailand over 20 times." Additional resource scorer 125 can determine relatedness scores for both additional resources that satisfy a threshold. Content from the first additional resource and content from the second additional resource can be utilized to generate additional content (e.g., a bias summary) that can be associated with the target electronic document and/or biased portions of the target electronic document in database 112.

As an example, referring again to FIG. 2, for the portion 205 of document 200, additional content determination engine 135 can identify all additional resources (or portions of additional resources) that satisfy a threshold as related to the portion 205. Further, additional content determination engine 135 can generate a summary that includes content from each of the additional resources, such as a bias summary for portion 205 that indicates "Jim Smith" may be biased towards Thailand because the only foreign country that he has been known to visit is Thailand. Further, Mr. Smith is a travel agent that specializes in booking trips to Thailand." The resulting bias summary includes content from a first resource (e.g., the author has traveled to only Thailand) and content from a second resource (e.g., the author is a travel agent specializing in Thailand travel).

Additional content renderer 130 causes the computing device of the user to render the additional content that is associated with the target electronic document in the database 112. The additional content is rendered simultaneously with the target electronic document so that the user, upon viewing the target electronic document, can view the additional content.

Additional content renderer 130 causes a computing device to render, along with the target electronic document, corresponding additional content determined by the additional content determination engine 135. For example, a user can select a document to view, and the document can be associated with additional content. Additional content renderer 130 can render the selected document (i.e., the target electronic document) along with the associated additional content, as described herein.

In some implementations, the additional content can be related to a particular biased portion of the target electronic document and the additional content renderer 130 can render the target electronic document with an indication that additional content is available and relevant to the particular biased portion of the target electronic document. The biased portion of the target electronic document can be rendered such that it is distinguishable from the rest of the document (e.g., underlined, bold-faced, capitalized, rendered in a different color) so that the reader can recognize that additional content is available for that portion of the document.

Figure 3:
FIG. 3 illustrates an example interface that includes a target electronic document rendered with biased portions that are associated with additional content highlighted.

In some implementations, additional content renderer 130 can render a selectable interface element that indicates additional content relevant to bias is available without rendering the additional content. For example, referring to FIG. 3, a target electronic document is provided with indications that additional content is available without rendering the additional content. As illustrated, the document 300 includes a first biased portion 305 that is highlighted in bold face font to indicate that additional content related to the biased portion 305 and/or to the entire target electronic document is available. The document 300 further includes a second biased portion 310 that is also highlighted to indicate that the statement may be biased and that additional content is available. In some implementations, the first portion 305 can be associated with different additional content than the second portion 310 (i.e., each biased portion is associated with different additional resources). In some implementations, multiple biased portions of a target electronic document can be associated with the same additional content. For example, additional content can be associated with the entire target electronic document (and not to a specific biased portion of the document). Thus, multiple biased portions in the document can be rendered with the same additional content that is relevant to all of the additional content. In some implementations, the biased portions can be selectable and the additional content may render upon selecting, as described herein with regard to FIG. 4.

In some implementations, additional content renderer 130 can render the target electronic document graphically associated with a bias summary that is generated based on identified related additional resources. For example, multiple additional resources can be related to a biased portion of the target electronic document and a bias summary can be generated based on the content of the additional resources, as previously described. Additional content renderer 130 can render the target electronic document with one or more graphical indications that a summary is available for a biased portion of the document.

In some implementations, the target electronic document can include one or more selectable portions that, when selected, cause at least a portion of one or more of the associated additional resources to be rendered. For example, a biased portion of the target electronic document can be associated with additional content that is generated from Document A and a portion of Document A, such as the most relevant portion, can be rendered with the target electronic document. Additionally, the target electronic document can include a link in the additional content to allow a reader to select the link and be provided with the entire Document A or an expanded portion of Document A.

As another example, a bias summary can be generated based on content of Document A and Document B. Additional content renderer 130 can render the bias summary or a portion of the bias summary with the target electronic document and the additional content can include the bias summary rendered with links to Document A and Document B. Thus, the user can select one of the links and be provided with the corresponding document and/or a relevant portion of the corresponding document.

In some implementations, the bias summary or additional content can be rendered in a separate section of the interface as the target electronic document. For example, referring to FIG. 4A, the target electronic document 400 is rendered by additional content renderer 130 in a first section of the interface. Additional content interface 405 includes rendered versions of the additional content and/or of a bias summary generated from additional resources. In some implementations, as illustrated, the additional content and/or bias summary can be provided with an indication of the biased portion of the target electronic document that is associated with the content and/or summary. For example, biased portion 410 is aligned with additional content 415 to inform the reader that the additional content 415 is relevant to the biased portion 410. As illustrated, the biased portion 410 is further highlighted to indicate that the statement may be biased, further informing the reader that additional content is included with the target electronic document. In some implementations, additional and/or alternative indications can be utilized to indicate which biased portion is associated with additional content and/or a bias summary (e.g., an arrow and/or other indicator extending from the additional content and pointing to a biased portion, color coding of additional content and biased portions).

As another example, biased portion 420 is associated with bias summary 425 based on alignment of the bias summary 425 with the biased portion 420. Bias summary 425 includes a textual summary as well as a listing of links 435 to documents that were utilized to generate the bias summary 430. Thus, the reader can select one of the links to be provided with the corresponding document and/or a portion of the corresponding document that is relevant to the biased portion 420.

Figure 4B:
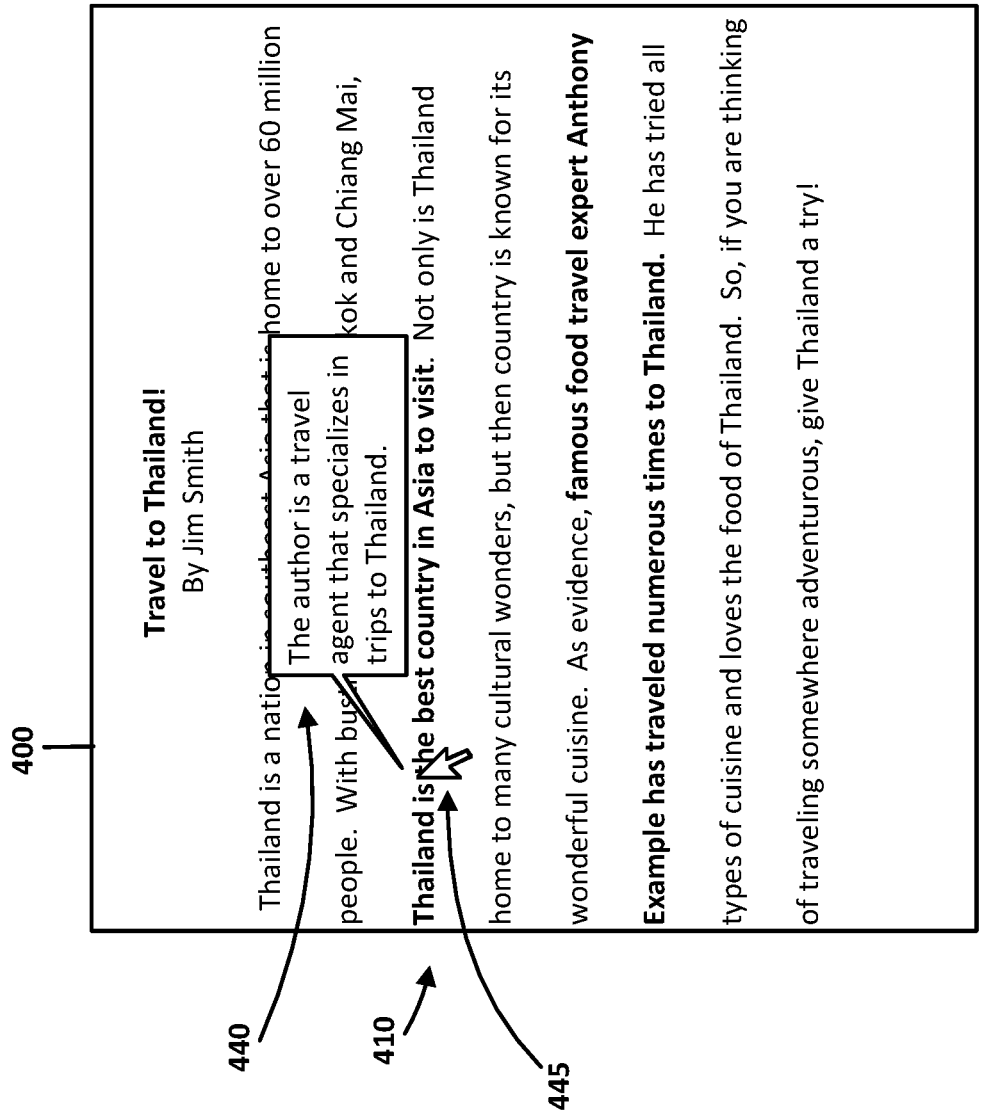
FIG. 4B illustrates an example of additional content rendered based on affirmative input by the user.

In some implementations, the bias summary and/or additional content may be rendered in a separate interface from the target electronic document. For example, referring to FIG. 4B, the same target electronic document as illustrated in FIG. 4A (i.e., document 400) is rendered without the additional content and/or the bias summary rendered with the document. As illustrated, a cursor 445 is hovering over biased portion 410 and a pop-up window 440 is rendered upon hovering over (or selecting) the biased portion. The pop-up window provides additional content that is associated with the biased portion 410. In some implementations, a bias summary can be rendered in the same manner. For example, a bias summary can be rendered with a summary or rendered with both a summary and additional selectable portions that, when selected, render at least a portion of one or more of the additional resources that were utilized to generate the bias summary (e.g., a pop-up window that includes the same information and links as additional content 425 of FIG. 4A).

In various implementations, additional content renderer 130 can be implemented (in whole or in part) by a corresponding one of the application(s) 107, can be installed as an extension of a corresponding one of the application(s) 107, and/or can interface (e.g., via an API) with a corresponding one of the application(s) 107. In response to accessing a given target electronic document via one of the application(s) 107, the additional content renderer 130 can access database 112 to determine whether the given target electronic document includes an entry in the database 112. For example, the database 112 can include an index of the entries based on URLs and/or other identifiers, and the additional content renderer 130 can search the index to determine whether an entry is present for the given target electronic document. If so, the additional content renderer can modify rendering of the given target electronic document, utilizing one or more techniques described herein. For example, the entry can include an indication of the biased portion(s) of the given electronic document, and such an indication utilized by the additional content renderer 130 to alter those biased portions such that they are highlighted, bolded, or otherwise demarcate as a queue to the user that they may potentially be biased. Also, for example, the entry can include an indication of additional content related to the biased portion(s) of the given electronic document, and the additional content renderer can cause the additional content to be automatically rendered, or cause it to be rendered in response to certain user input (e.g., a selection or hovering over a biased portion). The additional content rendered 130 can modify the rendering of the target electronic document to cause rendering of the additional content and/or can monitor for certain user input and cause the rendering to occur in response to the certain user input.

Figure 5:
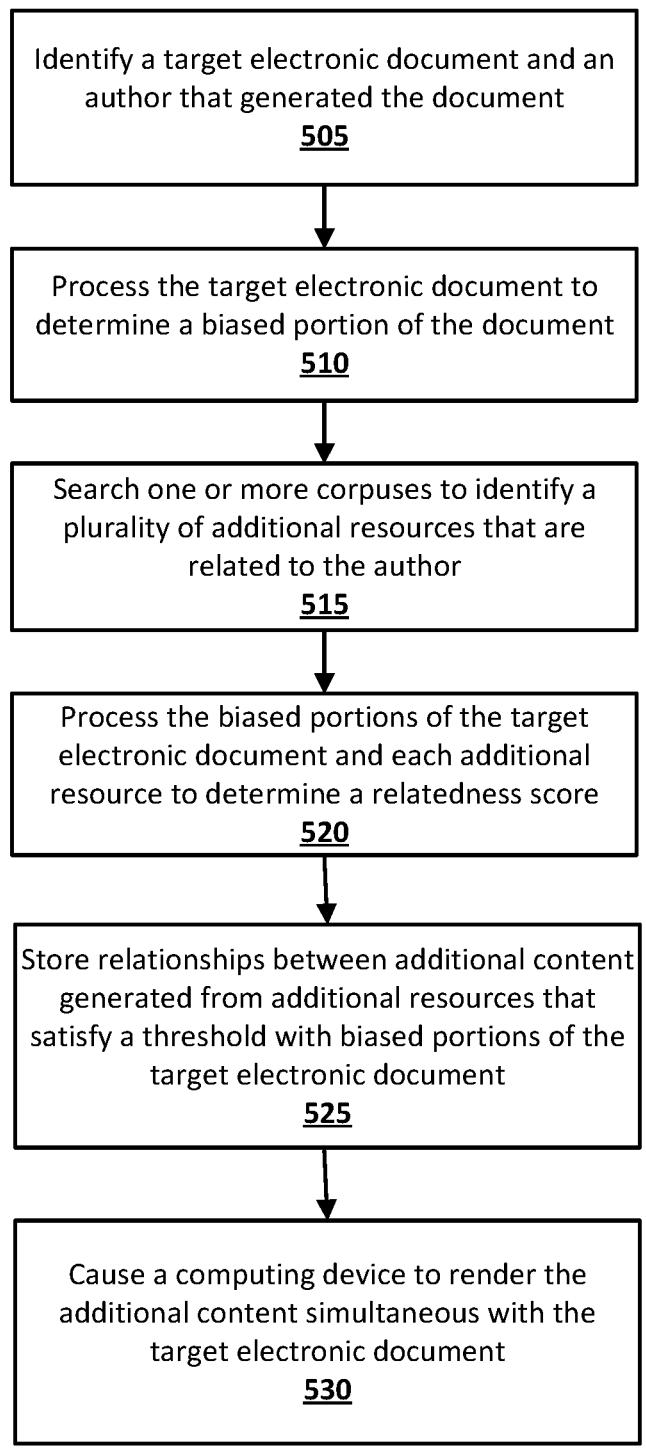
FIG. 5 illustrates a flowchart of an example method for rendering an electronic document with additional content and/or a bias summary associated with a biased portion of the target electronic document.

FIG. 5 illustrates a flowchart of an example method for rendering additional content related to a biased portion of a document. The steps of FIG. 5 can be performed by one or more processors, such as one or more processors of a client device. Other implementations may include additional steps than those illustrated in FIG. 5, can perform step(s) of FIG. 5 in a different order and/or in parallel, and/or may omit one or more of the steps of FIG. 5. The steps of FIG. 5 are described with respect to a source that is an author of a target electronic document. However, implementations of FIG. 5 can be performed with respect to other source(s) such as a publisher, a creator, or a combination of a publisher, creator, and/or author.

At step 505, a target electronic document and an author of the document are identified. The target electronic document can be identified based on a user navigating to the document. For example, the user can utilize one or more components of computing device 105 to select a document to view. The target electronic document can additionally or alternatively be identified as part of a crawling procedure, or based on being previously crawled and identified by the crawling procedure. Based on the content of the document and/or based on metadata associated with the document, one or more components can determine an author that generated the target electronic document. For example, a document can include a header and/or footnote that identifies a person as the author. Also, for example, metadata associated with the document can include author information.

At step 510, the target electronic document is processed to determine a biased portion of the document. The biased portion can be determined by a component that shares one or more characteristics with bias identification engine 115. For example, bias identification engine 115 can identify as biased based on term(s) included in the portion (e.g., statements with "best," "greatest," "I think," etc.). Also, for example, bias identification engine 115 can additionally or alternatively determine a portion of the document is biased by processing the portion utilizing a machine learning model, generating a measure based on the processing, and determining the measure satisfies a threshold that indicates likely bias.

At step 515, one or more corpuses are searched to identify a plurality of additional resources that are related to the author. The additional resources can be identified by a component that shares one or more characteristics with additional resource engine 120. The additional resources can include, for example, other documents generated by the author, other documents that mention the author, documents related to others that are mentioned by the author, and/or other resources that have a relation to the author.

At step 520, features of each of the additional resources and the biased portion of the target electronic document are processed to generate a relatedness score for each of the additional resources. The relatedness score can be generated by a component that shares one or more characteristics with additional resource scorer 125. For example, additional resource scorer 125 can provide the biased portion of the target electronic document and one or more of the resources as input to a machine model and utilize the output of the trained machine learning model to generate a relatedness score between the biased portion and the additional resource. In some implementations, additional resource scorer 125 can generate a relatedness score that is a binary score (e.g., "1" for related, "0" for unrelated). In some implementations, additional resource scorer 125 may can a relatedness score that is non-binary and that is representative of a level of relatedness between the additional resource and the biased portion.

At step 525, relationships between additional content generated from the additional resources and the biased portion of the target electronic document are stored in a database for those additional resources with relatedness scores that satisfy a threshold. The relationships can be stored in a database that shares one or more characteristics with database 112. In some implementations, the relationship can be between the entire target electronic document and additional content generated from one or more additional resources. In some implementations, the relationship may be between a particular biased portion of the target electronic document and the additional content.

At step 530, one or more components cause a computing device that is rendering the target electronic document to render the additional content simultaneously with the target electronic document. In some implementations, a component that shares one or more characteristics with additional content renderer 130 can cause the computing device to render the additional content with the target electronic document. For example, additional content renderer 130 can cause the client device 105 to render the additional content along with the target electronic document, such as illustrated in FIG. 4A. In some implementations, additional content renderer 130 can cause the client device 105 to render the target electronic document with selectable portions associated with biased portions such that, upon selecting the selectable portion, the corresponding additional content is rendered in a separate interface, as illustrated In FIG. 4B.

Figure 6:
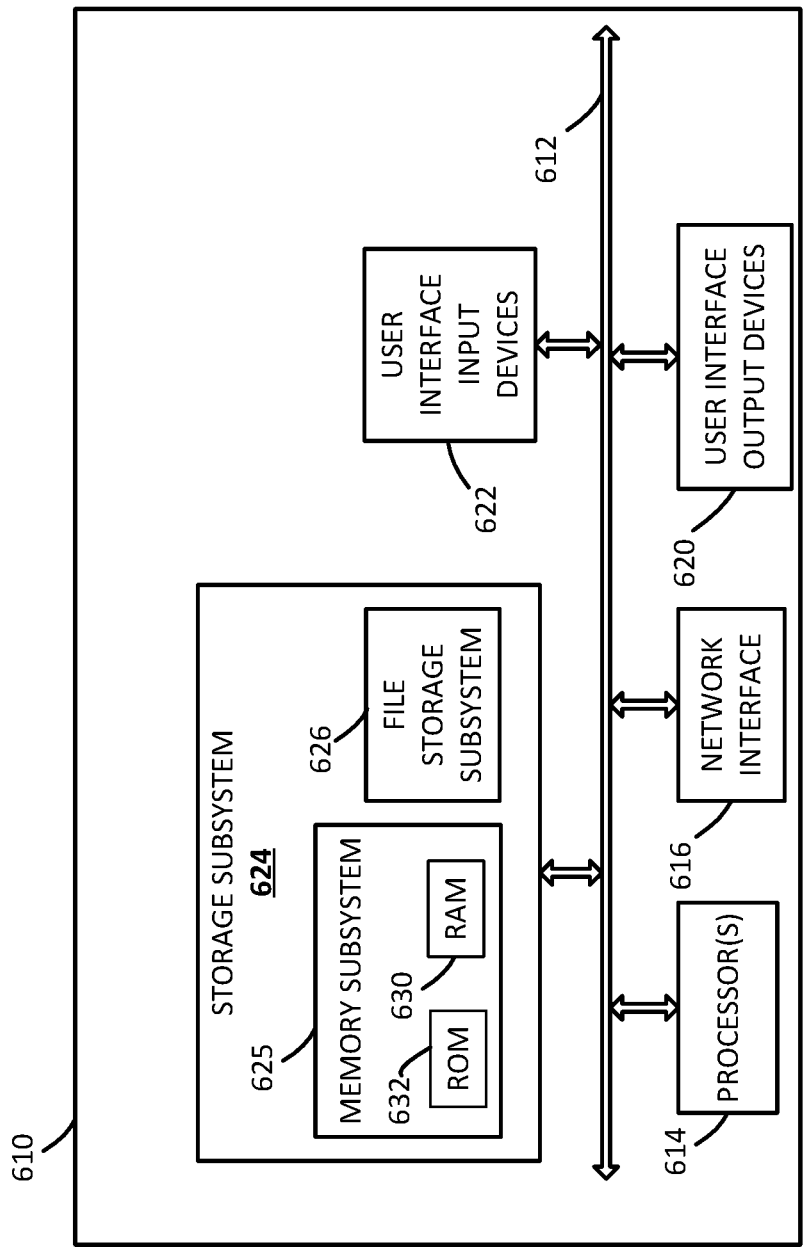
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   identifying a target electronic document and at least one source that generated the target electronic document;
   processing the target electronic document to determine a biased portion of the target electronic document;
   searching one or more corpuses to identify a plurality of additional resources that are related to the source;
   for each of the identified additional resources that are related to the source:
   processing corresponding additional resource features of a corresponding one of the additional resources and features of the biased portion to generate a corresponding relatedness score, wherein processing the corresponding additional resource features of the corresponding one of the additional resources and the features of the biased portion to generate the corresponding relatedness score comprises:
  applying the corresponding additional resource features and the features of the biased portion as input to a trained machine learning model, and
  generating the corresponding relatedness score based on processing the corresponding additional resource features and the features of the biased portion using the trained machine learning model, and
  wherein the corresponding relatedness score indicates a degree of relatedness between the biased portion and the corresponding one of the additional resources;
responsive to determining that the relatedness score, of a given additional resource of the additional resources, satisfies a threshold:
  defining, in one or more databases, a relationship between the target electronic document and additional content generated based on the given additional resource;
subsequent to defining the relationship, and responsive to the relationship being defined:
  causing a computing device that is rendering the target electronic document to render at least a portion the additional content simultaneous with the rendering of the target electronic document at the computing device.

2. The method of claim 1,
wherein defining the relationship between the target electronic document and the additional content generated based on the given additional resource comprises:
  defining a relationship between the biased portion of the target electronic document and the additional content; and
wherein causing the computing device that is rendering the target electronic document to render the at least a portion of the additional content simultaneous with the rendering of the target electronic document at the computing device comprises:
  causing the computing device to render the at least a portion of the additional content along with rendering an indication that the additional content is relevant to the biased portion.

3. The method of claim 1, wherein causing the computing device that is rendering the target electronic document to render the at least a portion of the additional content simultaneous with the rendering of the target electronic document at the computing device comprises:
  causing the computing device to initially render a selectable interface element that indicates additional content relevant to bias is available, without initially rendering the additional content; and
  causing the computing device to render the at least a portion of the additional content responsive to affirmative user interface input directed to the selectable interface element.

4. The method of claim 1, further comprising:
generating the additional content based on the given additional resource, wherein generating the additional content comprises one or multiple of:
  including a link to the given additional resource in the additional content,
  including a phrase from the given additional resource in the additional content, and
  including a summary of the given additional resource in the additional content.

5. The method of claim 1, further comprising:
generating the additional content based on the given additional resource and a further additional resource of the additional resources;
wherein generating the additional content based on the further additional resource is responsive to the corresponding relatedness score of the further additional resource satisfying the threshold.

6. The method of claim 1, wherein the additional resources related to the source include other documents generated by the source.

7. The method of claim 1, wherein the additional resources related to the source include documents that include references to the source.

8. The method of claim 1, wherein the additional resources related to the source include entries, in a knowledge graph, that are mapped to a source entry, of the knowledge graph, that corresponds to the source.

9. The method of claim 1, wherein the additional resources related to the source include documents that include references to one or more terms in the target electronic document.

10. The method of claim 1, wherein the source is an author, a creator, and/or a publisher.

11. The method of claim 1, further comprising:
processing the target electronic document to determine an additional biased portion of the target electronic document;
generating an additional relatedness score, wherein the additional relatedness score indicates a degree of relatedness between the additional biased portion and the given additional resource, wherein generating the additional relatedness score is based on processing of the corresponding additional resource features and additional features of the additional biased portion;
determining that the additional relatedness score fails to satisfy the threshold;
wherein defining the relationship between the target electronic document and the additional content generated based on the given additional resource comprises:
  defining the relationship between the biased portion of the target electronic document and the additional content, based on the relatedness score satisfying the threshold, and
  refraining from defining any relationship between the additional biased portion of the target electronic document and the additional content, based on the additional relatedness score failing to satisfy the threshold.

12. The method of claim 1, wherein causing the computing device that is rendering the target electronic document to render the at least a portion of the additional content simultaneous with the rendering of the target electronic document at the computing device comprises:
  causing the computing device to render the at least a portion of the additional content along with rendering an indication that the at least a portion of the additional content is relevant to the biased portion.

13. A method implemented by one or more processors, the method comprising:
  identifying a target electronic document and at least one source that generated the target electronic document;
  processing the target electronic document to determine a biased portion of the target electronic document;
  searching one or more corpuses to identify a plurality of additional resources that are related to the source;

determining a relatedness score between each of the additional resources and the biased portion of the target electronic document wherein determining the relatedness score for a given additional resource, of the additional resources, and the biased portion of the target electronic document comprises:
  applying additional resource features of the given additional resource and features of the biased portion as input to a trained machine learning model, and
  generating the relatedness score based on processing the additional resource features and the features of the biased portion using the trained machine learning model;
generating a bias summary for the biased portion of the target electronic document, wherein the bias summary is generated based on one or more of the additional resources and the relatedness scores of the corresponding one or more additional resources;
responsive to a request, from a computing device, for the target electronic document:
  causing the computing device to render an interface that includes the target electronic document with a selectable portion that, when selected, causes the bias summary to be rendered along with the target electronic document.

14. The method of claim 13, wherein the selectable portion comprises the biased portion, and further comprising causing the biased portion to be graphically demarcated from non-biased portions of the target electronic document.

15. The method of claim 13, wherein the bias summary, when rendered, is rendered in a separate interface portion when a user selects the selectable portion of the target electronic document.

16. The method of claim 13, wherein the selectable portion consists of the biased portion.

17. The method of claim 13, wherein the bias summary, when rendered, is rendered in a separate section of the interface from the target electronic document, and wherein selecting the bias summary, when rendered, causes at least a portion of the one or more additional resources to be rendered.

18. The method of claim 13, wherein the bias summary is generated based on at least a first additional resource and a second additional resource of the one or more of the additional resources.

19. A system, comprising:
a database;
memory storing instructions;
one or more processors executing the instructions, stored in the memory, to cause the one or more processors to:
  identify a target electronic document and at least one source that generated the target electronic document;
  process the target electronic document to determine a biased portion of the target electronic document;
  search one or more corpuses to identify a plurality of additional resources that are related to the source;
  for each of the identified additional resources that are related to the source:
    process corresponding additional resource features of a corresponding one of the additional resources and features of the biased portion to generate a corresponding relatedness score, wherein in processing the corresponding additional resource features of the corresponding one of the additional resources and the features of the biased portion to generate the corresponding relatedness score, one or more of the processors are to:
      apply the corresponding additional resource features and the features of the biased portion as input to a trained machine learning model, and
      generate the corresponding relatedness score based on processing the corresponding additional resource features and the features of the biased portion using the trained machine learning model, and
    wherein the corresponding relatedness score indicates a degree of relatedness between the biased portion and the corresponding one of the additional resources;
  responsive to determining that the relatedness score, of a given additional resource of the additional resources, satisfies a threshold:
    define, in the database, a relationship between the target electronic document and additional content generated based on the given additional resource;
  subsequent to defining the relationship, and responsive to the relationship being defined:
    cause rendering of at least a portion of the additional content simultaneous with the rendering of the target electronic document.

* * * * *